Figure 1:
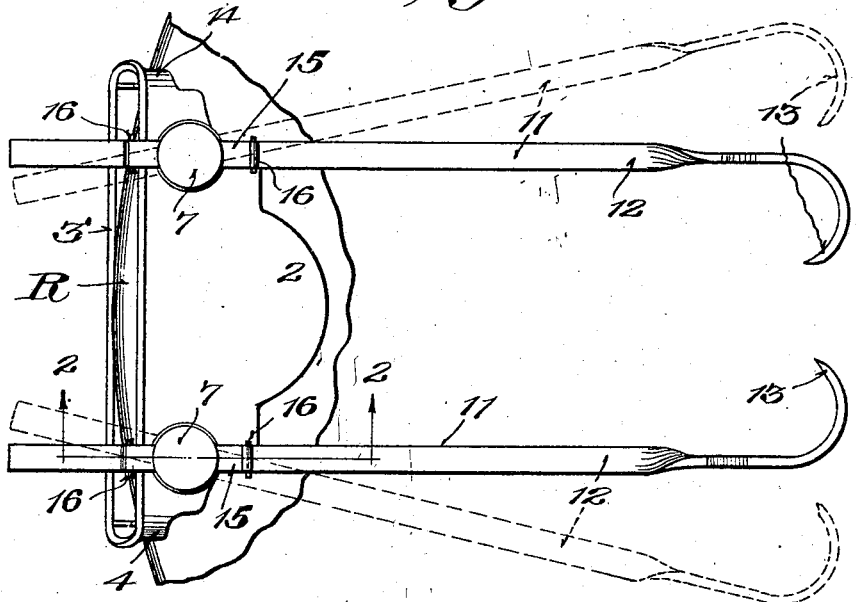

May 15, 1928.

D. S. GORDON

MEAT HOLDER

Filed July 19, 1927

1,669,980

Douglas S. Gordon
INVENTOR

BY Joseph A. Miller
ATTORNEY

Patented May 15, 1928.

1,669,980

UNITED STATES PATENT OFFICE.

DOUGLAS S. GORDON, OF NEW ROCHELLE, NEW YORK.

MEAT HOLDER.

Application filed July 19, 1927. Serial No. 206,895.

This invention relates to certain new and useful improvements in meat holders, and the primary object thereof is to provide a device of this kind which can be readily and easily manipulated so as to reliably hold the meat on the platter during carving thereof.

A further object of the invention is to provide a meat holder which is composed of a minimum of parts and one wherein the entire structure can be easily and quickly shifted as a unit to various positions about the platter as desired.

In the drawings:—

Figure 2:
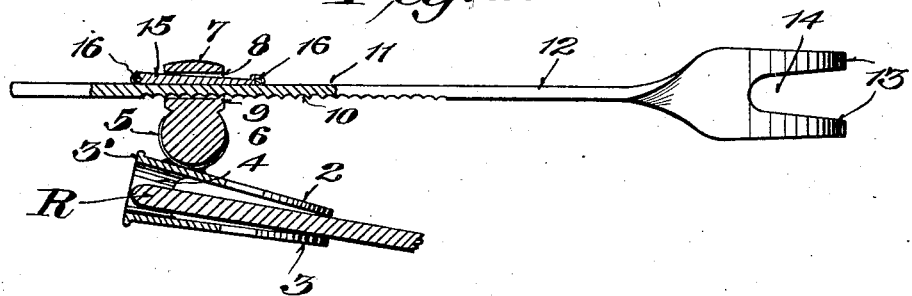

Figure 1 is a top plan view of the invention applied to a platter, the latter being shown in fragment, and Figure 2 is an enlarged section on line 2—2 of Fig. 1.

In proceeding in accordance with the present invention, a clip is employed which is formed of spring or resilient metal and which has opposed jaws 2 and 3 adapted to grip opposite sides of the rim R of a meat platter. The jaws 2 and 3 are formed integral with a head 3', the latter being of rectangular open formation so as to enable the rim of the platter to be received therein as shown in the drawings. The ends of the head have inwardly projecting stops 4 which latter seat against the periphery of the rim of the platter so as to firmly support the clip from the platter when the jaws 2 and 3 engage the latter, as depicted in the drawings. A spring or resilient socket 5 is secured to the upper face of the jaw 2 and receives a ball 6 therein. The ball 6 is movable in the socket 5 in all directions and has a head 7 which is transversely slotted at 8. The head is further formed with a tooth 9 which latter extends into the slot 8 and is formed to engage in the space between the selected teeth 10 formed on the rear ends of the arm or shank 11 of the fork or gripper 12. In the present case there are two forks or grippers employed and each of the latter has a hooked end 13 which is sharpened so as to bite into the meat and thus obtain firm anchorage thereon. Preferably the forks or grippers are bifurcated as indicated at 14 whereby it will be observed that each fork grips the meat at two points and thus obtains a more firm and effective anchorage thereon. In order to provide for easy and quick adjustment of the forks or grippers and to also assure of same being reliably held in adjusted position, wedges 15 are employed which operate in the slots 8 and which at their ends are provided with transverse pins 16, the pins serving as finger grips to enable the wedges to be easily and conveniently manipulated.

In operation, the clip is positioned on the platter at the desired point, the wedges being removed or disposed in inoperative position, whereupon the forks or grippers 12 are engaged with the meat and with opposite sides of the latter. It will be noted that the forks or grippers 12 can be moved through the slots 8 to desired positions, whereupon the wedges are slid inwardly so as to cause the teeth 9 to engage with the teeth 10 of the respective grippers, which results in the grippers being rigidly held in position. It will be noted that due to the ball and socket joint 5—6 the grippers can be moved vertically as well as horizontally or in brief, otherwise giving a substantially universal movement, which enables the device to be easily and quickly engaged with the meat so as to effectively hold same in position on the platter.

Having thus described my invention what I claim as new and desire to secure by Letters Patent is:—

1. In a meat holder, a clip composed of a head of substantially rectangular and open formation for receiving the rim of a platter and having opposed integral spring jaws to engage opposite faces of the rim, said head having inwardly extending stops on its ends to engage the periphery of the rim, a pair of sockets secured to the upper jaw, a ball movable in each socket, a transversely slotted head on each ball having a tooth extending into the slot thereof, a meat gripper having a forked end and having a shank slidable in each slot and having its teeth formed to engage the tooth of the socket head and a wedge in each slot having a transverse finger engaging pin at each end thereof for effecting holding the teeth of the socket heads in engagement with the teeth of the grippers.

2. In a meat holder, a clip composed of a head of substantially rectangular and open formation for receiving the rim of the platter and having opposed integral spring jaws to engage opposite faces of the rim, said head having inwardly extending stops on its ends to engage the periphery of the rim, a pair of sockets secured to the upper jaw, a ball movable in each socket, a transversely slotted head on each ball having a tooth extending into the slot thereof, a meat gripper having a forked end and having a shank slidable in each slot and having its teeth formed to engage the tooth of the socket head, and a wedge in each slot to effect holding of the teeth of the socket heads with the teeth of the grippers.

3. In a meat holder, a clip having opposed spring jaws to engage opposite faces of the rim of a meat platter, a socket on the clip, a ball movable in the socket and having a transversely slotted head provided with a tooth extending into the slot, a meat gripper having a toothed shank slidable in the slot, and a wedge in the slot to force and hold the teeth of the shank into engagement with the tooth of the head.

4. In a meat holder, platter engaging means, a pair of meat engaging members having their free ends terminating in opposed hooked portions, and means to pivotally mount the opposite ends of the meat engaging members in spaced relation upon the platter engaging means.

5. In a meat holder, platter engaging means, a pair of meat engaging members having their free ends terminating in hooked portions, means to mount the opposite ends of the meat engaging members in spaced relation upon the platter engaging means, and means to afford lateral movement of the meat engaging means toward and away from each other.

6. In a meat holder, a clip, meat engaging means, means for pivotally and slidably mounting the meat engaging means upon the clip, and a wedge member carried by said mounting to secure the meat engaging means in its slid position.

7. In a meat holder, platter engaging means, a pair of meat engaging members having their free ends terminating in hooked portions, means to mount the opposite ends of the meat engaging members in spaced relation upon the platter engaging means, means to afford lateral movement of said members, means to afford longitudinal adjustment of said members, and means carried by the mounting means to secure the members in their longitudinally adjusted position.

8. In a meat holder, platter engaging means, meat engaging means, a ball and socket device carried by the platter engaging means, a transversely slotted head on the ball of said device extending beyond the socket, to slidably receive the meat engaging means in the slot whereby to allow of universal and sliding movements of the meat engaging means, and means to hold the meat engaging means against sliding.

In testimony whereof I have hereunto signed my name to this specification.

DOUGLAS S. GORDON.